Patented July 19, 1932

1,868,151

UNITED STATES PATENT OFFICE

PETER SHESTAKOFF, OF PARIS, FRANCE

PROCESS FOR PREPARING SOLID OR HALF-SOLID SOLUTIONS OF ALKALINE HYPOCHLORITES

No Drawing. Application filed June 20, 1931, Serial No. 545,846, and in France June 27, 1930.

According to the process known up to now, the solidification of the aqueous solutions of the alkaline hypochlorites is made by adding soap prepared with saturated fatty acids to the solution of alkaline hypochlorite in the heat.

As soap is dissolved with difficulty and very slowly in the solutions of alkaline salts, it is necessary to heat for a long time the solution of hypochlorites sometimes above 60° C.

Such treatment often produces the decomposition of hypochlorites and reduces the chlorometric degree of the final product.

The present invention relates to a method, which gives the possibility of operating at a much lower temperature, thus allowing to avoid the decomposition of hypochlorites; products of the requested chlorometric degree can be thus obtained.

This process consists in the dissolution either of the soap or of the fatty acids not in the hypochlorite solutions, but in the caustic alkalines of a determined concentration.

If after this such solution is treated by chlorine, it is transformed into hypochlorite solution. The latter owing to the presence of salts of the fatty acids coagulates at room temperature to a hard or a half-hard mass.

The inventor moreover found that the hardness, the homogeneousness and the stability of the final product depends on the concentration of the solution as well as on the quantity and quality of the salts of the fatty acids.

The more the solution contains of alkaline salts of mineral acids, the more the product obtained is hard and homogeneous. But one should never add the quantity of alkaline salts that provokes separation of the homogeneous solution.

The optimum concentration is the concentration nearest to the one at which the salts of the fatty acids begin to separate at room temperature from the solution.

These solutions will be more concentrated when the molecular weight of the saturated fatty acids used in the preparation of soap is smaller.

Thus the lauric, capric, caprylic, caproic acids or a mixture of these acids are well appropriate for this purpose.

Practically it is easy to obtain such a mixture by fractionary distillation in a vacuum of the acids of cocoanut oil. The first fraction of such distillation is composed only of these four acids.

For instance: to prepare one kilogram of solid hypochlorite at 18° chlorometric degrees one melts by heating in 790 gr. of caustic soda of 14° Bé., 27.5 gr. of a mixture (the saponification value—295 mgr.) of caproic, caprylic, capric and lauric acid abtained by distillation of cocoanut oil acids, and 57 gr. of gaseous chlorine are introduced; 50 gr. of sodium silicate at 36° Bé. and 50 gr. of crystallic sodium carbonate then added.

At room temperature the liquid product is transformed to a solid jelly.

The presence of a small quantity of alkalis and alkaline carbonates in the solidified hypochlorites is indispensable for their stability.

Solutions of solid hypochlorites of a high chlorometric degree of more than 40° are preferably obtained by starting from caustic potassium or from a mixture of potassium and soda.

Having thus described my invention, what I claim, and desire to secure by Letters Patent is:

1. The process for preparing solid solutions of hypochlorite alkalis, which consists in adding to the aqueous solution of alkalis, alkaline salts of saturated fatty acids, heating the mixture until the entire dissolution of the soap is obtained and then saturating it with chlorine.

2. The process for preparing solid solutions of hypochlorite alkalis, which consists in adding to the aqueous solution of alkalis, alkaline salts of saturated fatty acids, heating the mixture until the soap obtained is entirely dissolved and saturating it with chlorine, then adding alkaline salts or water so as to obtain a concentration very near to the one at which the alkaline salts of the fatty acids begin to separate from the solution at room temperature.

PETER SHESTAKOFF.